Nov. 30, 1965   G. A. STORCH ETAL   3,220,236
INDEXING MECHANISM FOR A MACHINE TOOL
Filed April 15, 1963   4 Sheets-Sheet 1

INVENTORS
GEORGE A. STORCH
PAUL R. BOHART
BY
Howard Weiser
& Jack J. Earl
ATTORNEYS

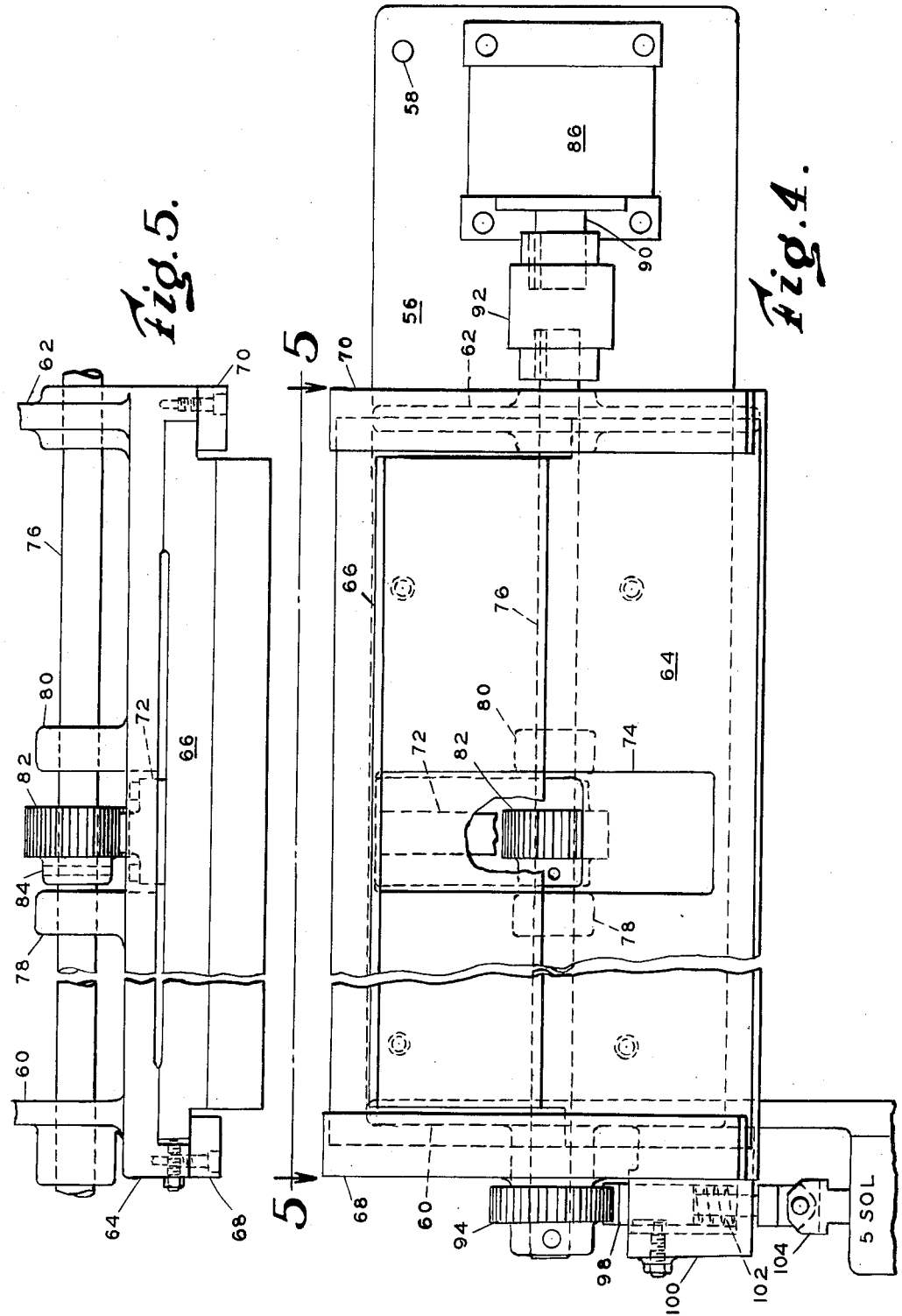

United States Patent Office 3,220,236
Patented Nov. 30, 1965

3,220,236
INDEXING MECHANISM FOR A MACHINE TOOL
George A. Storch and Paul R. Bohart, Cincinnati, Ohio, assignors to The Cincinnati Milling Machine Co., Cincinnati, Ohio, a corporation of Ohio
Filed Apr. 15, 1963, Ser. No. 273,184
4 Claims. (Cl. 72—81)

The present invention relates to machine tool tracing mechanisms and more particularly to a mechanism by which a plurality of pattern templates is indexed to present the templates one at a time for engagement by a contour tracing mechanism controlling the movement of a machine slide.

It is often advantageous in metal forming operations which are conducted under the control of tracing mechanisms that utilize contour sensitive devices such as fluid operated tracer valves or other analogous mechanisms to make a plurality of forming passes of relative fineness. Operations of this nature are often performed, for example, on metal spinning lathes where the contours to be formed have wide variations in diameter end to end and the machine is incapable of producing the contours by a single forming pass due to the forces exerted either on the machine components, or on the workpieces or both. In these operations, it is a common practice to make a series of rough passes and then a finishing pass by the use of a plurality of templates having contours of progressively varying shapes. The multiple forming passes finally produce a desired contour after their successive performance. Frequently in spinning operations the workpieces are formed over a contour which extends across the full radial swing of the spinning lathe and therefore the templates used must extend out from their holder by at least the distance of the radial range of the lathe. Conventional drum type rotary mechanisms then are impractical to provide the template indexing since the space requirements for the drum indexer are more than twice the radial range of the machine. For example, in a lathe designed for a swing diameter of 26 inches, the templates will frequently be about 13 inches in contour depth. For a drum indexer to be used to present the plurality of templates to the tracer, the space allotted for the indexer would be greater than the 26 inches in diameter and approximately a 30 inch diameter would be normal. The indexing mechanism is usually attached to the front or to the rear of the lathe and consequently the tracing and indexing mechanisms would approximately double the over-all front to rear dimensions of the machine. Moreover, in the case of hand tracer controlled machines, the tracing attachment is normally on the front of the machine where the operator is positioned and a large drum indexer and templates attached to it would interfere with the operator's access to the machine for exchange of workpieces and the like.

It is therefore the object of this invention to provide a template indexing mechanism which will operate to present a series of templates for tracing one at a time and yet will be compact and use a minimum of space even though the contour depth of each of the templates is large.

It is also an object of this invention to provide a non-rotary template indexing mechanism which will present a series of templates of progressively varying contour for tracing, one at a time, in a manner such that only one template is engageable by the tracing mechanism at any time.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form this invention is combined with a tracing mechanism having a stylus normally oriented on an axis extending in a fixed direction and deflectable laterally therefrom to control the operation of a motor moving a slide. The templates are received on a carriage in the index mechanism and extend from it in a direction transverse to the stylus in an obliquely stepped array. The edges of the templates toward the stylus are formed in accordance with the contour of the workpiece in progressively more accurate representations of the final shape to be formed. The slide on which templates are attached is reciprocally movable in the direction of the oblique stack of templates, which direction is inclined to the normal axial direction of the tracer stylus. For any one of a series of preset positions of the template slide, one of the templates extends toward the stylus for engagement thereby. The templates on one side of that one template are beyond the end of the stylus and cannot be contacted while those on the other side are prevented from being in contact with the stylus by that one template.

A clear understanding of this invention can be obtained from the following detailed description in which reference is made to the attached drawings wherein:

FIG. 4 is a front view of the mechanism of FIG. 2, partly in section.

FIG. 5 is a top view of the mechanism as viewed from line 5—5 of FIG. 4.

Figure 1:
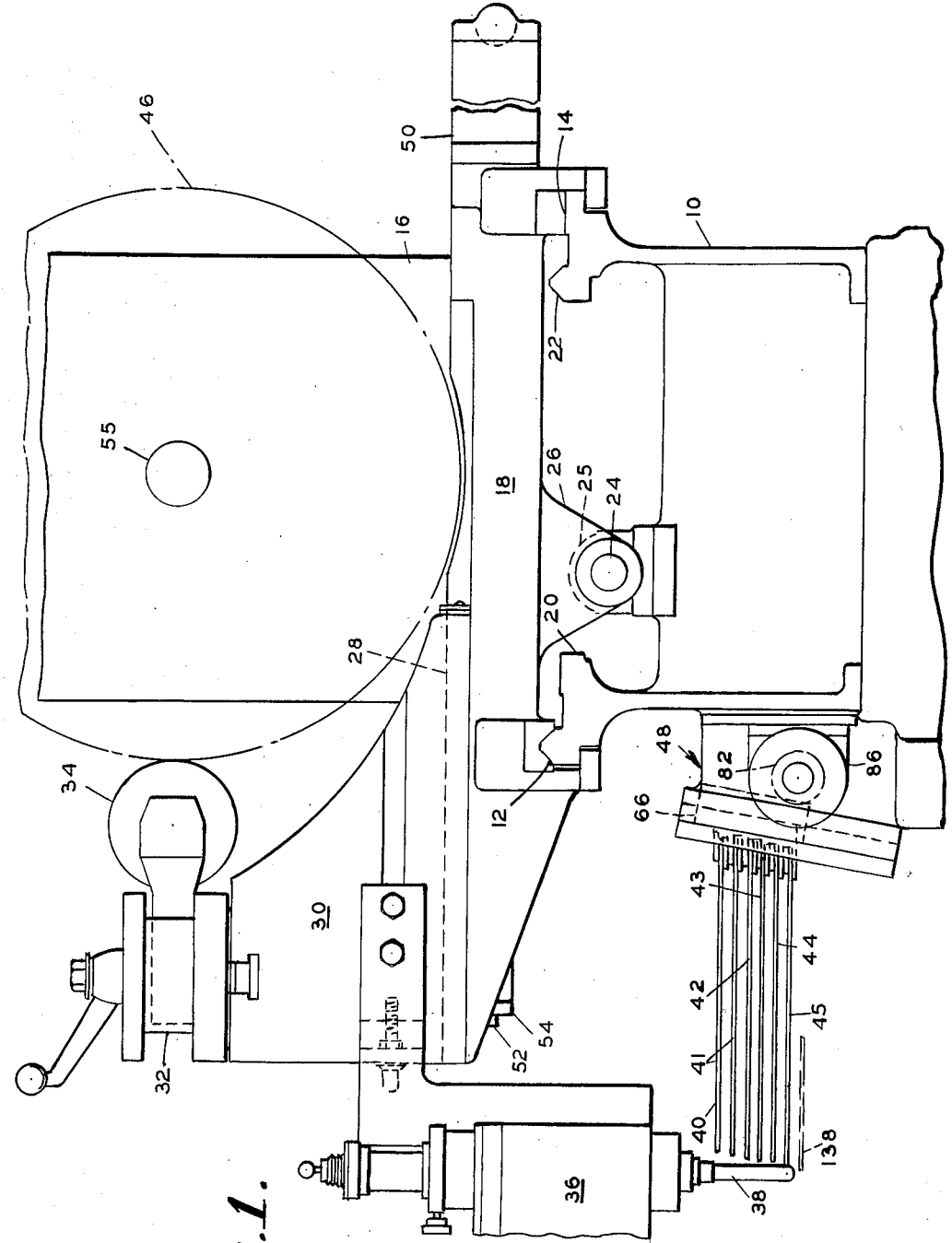
FIG. 1 is an end view of a hand hydraulic spinning lathe on which the index mechanism of this invention is attached, the machine being shown without a tailstock mechanism.

In FIG. 1, a manually controlled, hydraulic powered metal spinning lathe is shown having a base 10 on which parallel ways including a V way 12 and a square way 14 extend for a headstock 16 for sliding support of a saddle 18. The base also has a second set of ways 20, 22 for sliding support of a tail-stock (not shown). The saddle 18 is movable along the ways 12, 14 by the reciprocation of a piston rod 24 which is connected to a yoke 26 depending below the saddle 18 between the ways 12, 14. The piston rod 24 is reciprocated by operation of a piston and cylinder motor 25 fixed in the base 10 of the machine. The saddle 18 also has a set of dovetail cross slide ways 28 formed on the top thereof that extend transversely relative to the ways 12, 14. A cross slide 30 is slidably received on the ways 28 and the cross slide 30 carries a tool post 32 on which a spinning roller 34 is rotatably received. A hydraulic tracer mechanism 36 is attached to the cross slide 30 from which a tracing stylus 38 extends normally downward in the vertical direction. The tracer mechanism 36 can be of any well known construction in which manual control of the unit is employed to maintain the stylus 38 in contact with one of a set of templates 40–45. A tracer valve mechanism of this type which will perform satisfactorily in the mechanism is shown in U.S. Patent 3,084,899 issued April 9, 1963 on an application filed October 21, 1957 by Lewis A. Dever and Charles L. Gschwind. The valve of this cited application may be connected in the described spinning lathe to control the movement of members along two axes and the portion of the valve responsive to axial deflection of the stylus 38 is not connected in circuit since only two axes of control are required in the lathe.

The swing range of the machine is indicated by the circle 46 and the tracing range of the templates such as those shown at 40–45 must be sufficient for a contour depth approximating the radius of the swing. Thus the templates 40–45 extend outward from their supporting and indexing mechanism 48 a considerable distance to provide room for the full range of contour depth. Movement of the cross slide 30 to shift the roller 34 over the contour depth is accomplished by operation of a piston and cylinder motor 50 attached to the rear of the saddle 18 and which has a piston rod 52 connected to the cross slide 30 at a portion 54 thereof depending below the ways 28. The operation of the motor 50 is controlled by the lateral deflection of the stylus 38 toward and away from the machine ways 12, 14 in a direction parallel to the cross slide ways 28. The deflection of the stylus 38 in a direction parallel to the ways 12, 14 operates the motor 25 to move the saddle 18 in coordination with the cross slide 30 to produce the desired contour on a workpiece while it is rotated on the axis of a spindle 55 journaled in the headstock 16 and parallel to the ways 12, 14. Fluid control circuits to operate the motors 25, 50 in response to the described deflections of the stylus 38 are known in the art as exemplified by the previously cited U.S. patent application and further description in this regard is deemed unnecessary.

Figure 2:
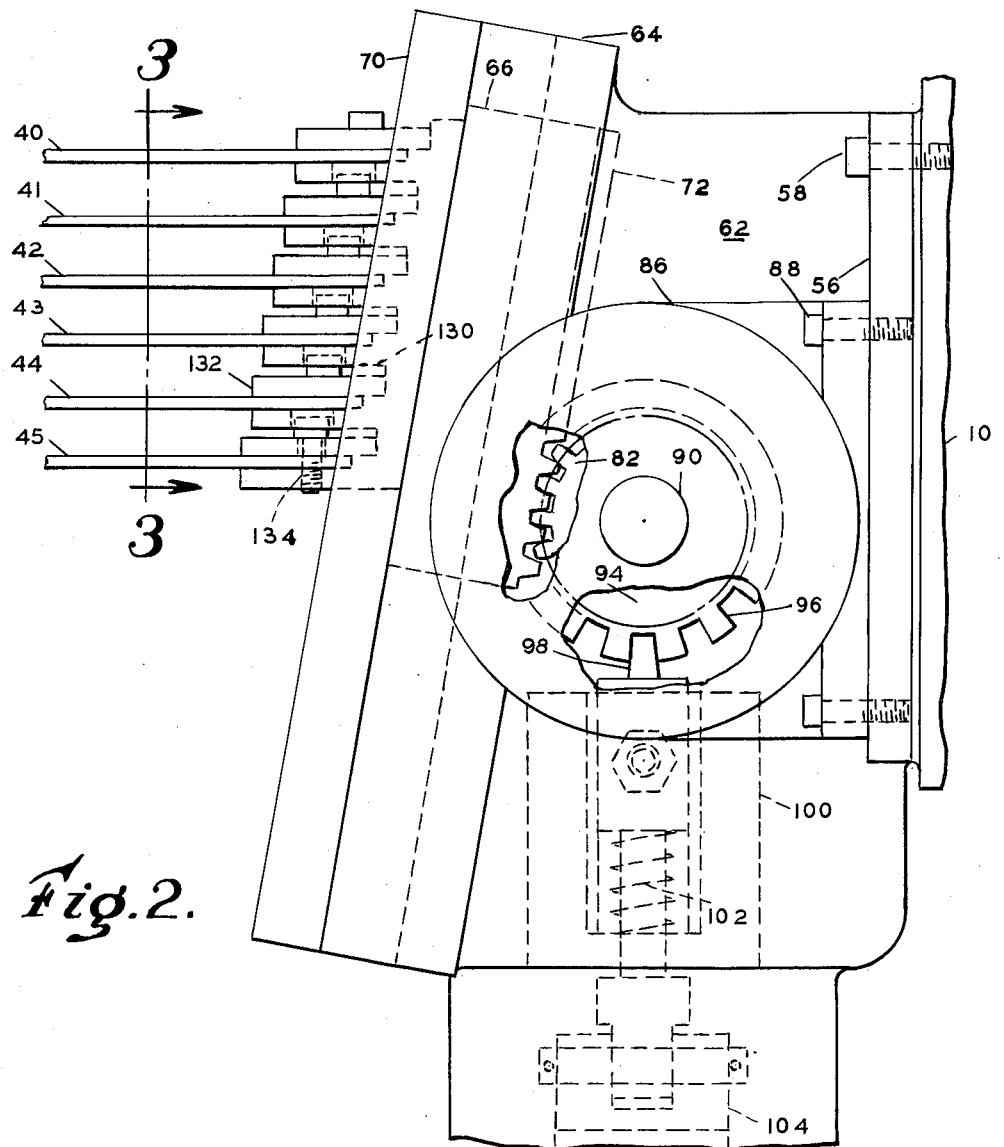
FIG. 2 is an enlarged end view of the index mechanism, partly in section.
Figure 3:
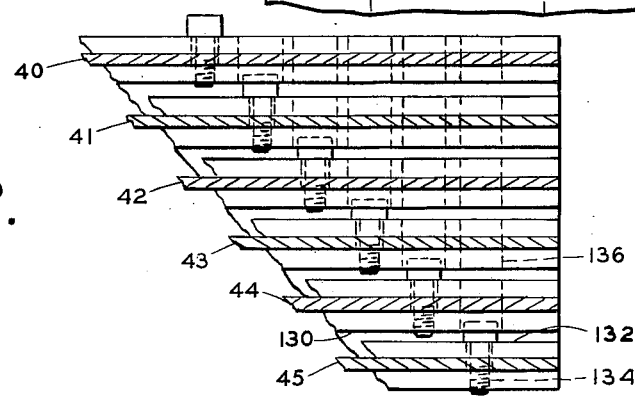
FIG. 3 is a partial section view of the mechanism of FIG. 2 taken on line 3—3.

The index mechanism 48 is shown in detail in FIGS. 2 through 5. The mechanism is supported on a mounting plate 56 which is fixed to the front of the base 10 below the way 12 by means of machine screws 58. A pair of end members 60, 62 extend outward from the plate 56 at each end and a top portion 64 extends across these end members. The top portion 64 is inclined slightly such that it is obliquely oriented relative to the vertical direction which is the normal axial direction from which the stylus 38 is deflected to produce control signals. The top portion 64 is adapted to slidably support a template carriage 66 for movement in the inclined direction. (The carriage 66 is shown in simplified form in FIGS. 4 and 5 without the templates 40–45 being attached thereto to simplify the drawings. The actual structure of the carriage 66 is shown in FIGS. 2 and 3.) A pair of retaining rails 68, 70 are fixed to the top portion 64 at each end to overlap the carriage 66 and hold it on the top portion 64. A rack 72 is fixed to the back side of the carriage 66 and extends through an opening 74 in the top portion 64. A drive shaft 76 is journaled through the end members 60, 62 and through a pair of lugs 78, 80 which extend from the back side of the top portion 64 on either side of the opening 74. A pinion gear 82 is fixed on the shaft 76 by a pin 84 and the gear 82 is in mesh with the rack 72. The pinion gear 82 and shaft 76 are selectively rotatable in one direction or the other by operation of a motor 86 which is secured to one end of the mounting plate 56 by screws 88. The output shaft 90 of the motor 86 is connected to the drive shaft 76 by a coupling member 92 that is keyed to both of these shafts. The motor 86 is of the single rotary vane type adapted to produce reversible limited angular movement of a member, an example of which is shown in U.S. Patent 2,793,623 issued May 28, 1957 on an application filed by Carl Ludwig, Charles H. Wheeler and Alfred R. Deedman. As the motor 86 is operated in one direction and the other, the pinion 82 drives the carriage 66 up and down the inclined top portion 64 through the engagement with the rack 72 attached to the carriage 66.

The carriage 66 is positionable in a predetermined series of locations on the top portion 64 of the indexing mechanism. To define these positions, an index wheel 94 is fixed on the end of the shaft 76 opposite the motor 86.

The index wheel 94 has a series of notches 96 on the periphery thereof and a stop plunger 98, slidably received in a block 100 fixed on the end member 60, is urged by a spring 102 toward the index wheel 94 for entry into one of the notches 96. When the plunger 98 is inserted into a notch 96, the index wheel 94, shaft 76 and motor 86 are all prevented from rotating. The lower end of the plunger 98 extends out of the block 100 and is pivotally connected to an actuating plunger 104 which can be shifted downward by an electrical solenoid 5SOL. When the solenoid 5SOL is energized, the actuating plunger 104 pulls the stop plunger 98 downward against the bias force of the spring 102 and withdraws the stop plunger 98 from the wheel 94 to free the drive mechanism for rotation.

Figure 6:
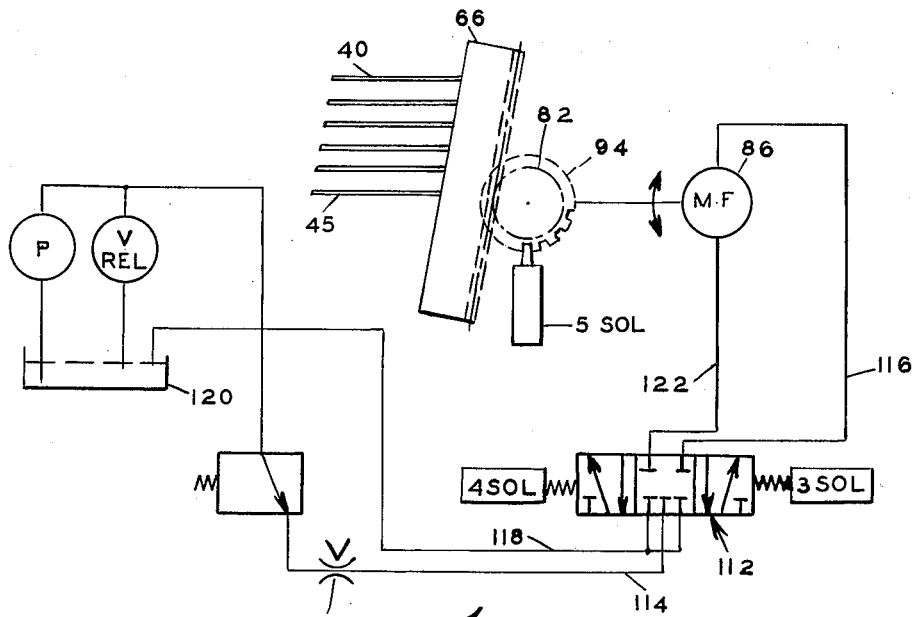
FIG. 6 is a schematic hydraulic circuit to operate the indexing mechanism.
Figure 7:
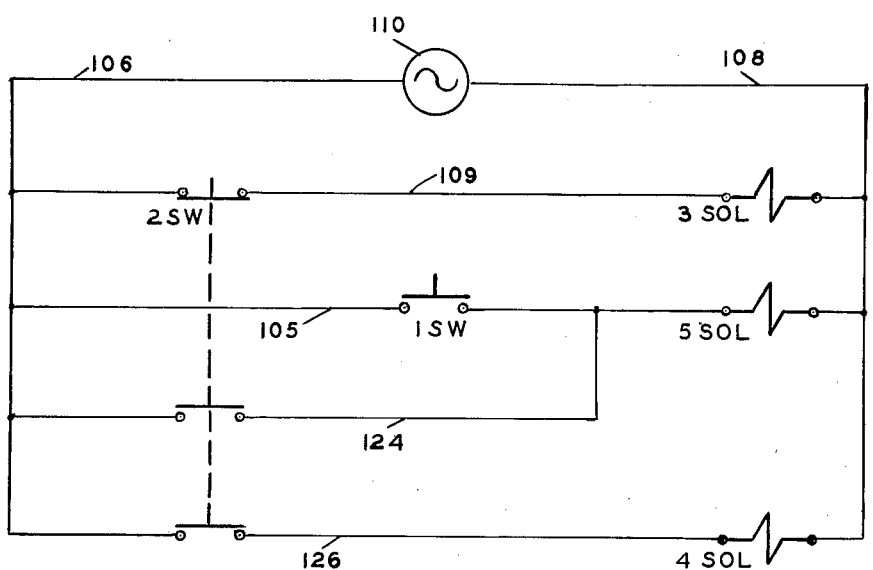
FIG. 7 is a schematic electrical control circuit to determine the operation of the hydraulic circuit.

The indexing movement of the carriage 66 is best described in conjunction with the schematic electrical and hydraulic circuits of FIGS. 6 and 7. An index switch 1 controls the downward movement of the carriage 66 a step at a time. The switch 1SW is momentarily closed to complete a circuit through the conductor 105 to energize the solenoid 5SOL which is then connected across the power lines 106, 108 extending from the power source 110. The plunger 98 is then momentarily withdrawn from the index wheel 94. At this same time a solenoid 3SOL is energized due to a circuit being completed through a set of normally closed contacts of a switch 2SW in a conductor 109 across the power lines 106, 108. The solenoid 3SOL shifts a valve 112 to the condition in which a fluid pressure conduit 114 is connected to a motor operating line 116 while a main low pressure return line 118 to a fluid reservoir 120 is connected to a second motor operating line 122. Thus the motor 86 is under a pressure differential tending to operate it in one direction at the time that the plunger 98 is withdrawn from the index wheel 94. The motor 86 then is free to rotate the drive shaft 76 and with the valve 112 as described, the direction of rotation is such that the pinion gear 82 is rotated to move the carriage 66 downward. As soon as the carriage begins to move, the switch 1SW is released and the stop plunger 98 is returned toward the index wheel 94. The plunger 98 will then push into the next notch 96 as it is turned in registration with the plunger 98 and the movement of the carriage 66 will be stopped in its next lower predetermined position. This indexing downward can be repeated until the motor 86 reaches the extreme of its angular operation in the direction producing downward movement of the carriage 66.

The carriage 66 can be returned to its uppermost position by reversing the motor 86 while the plunger 98 is withdrawn from the index wheel 94. This is accomplished by operation of the switch 2SW to open its normally closed contacts thus deenergizing the solenoid 3SOL and at the same time closing its normally open contacts in the conductors 124, 126 to energize the solenoid 5SOL and a second solenoid 4SOL connected to the valve 112. The valve 112 is shifted to connect the pressure fluid line 114 to the motor operating line 122 while the other operating line 116 is connected to the main return line 118. The motor 86 is then under a pressure differential to reverse its movement and the plunger 98 is withdrawn. The motor 86 then operates to move the carriage 66 upward as long as the switch 2SW is held operated. The motor 86 will reach its other extreme of angular movement and the carriage 66 will be stopped in its uppermost position. The switch 2SW is then released and the solenoids 4SOL and 5SOL are deenergized. The carriage 66 will begin downward movement until the plunger 98 pushes into the notch 96 corresponding to the uppermost predetermined position of the carriage 66 and further movement will be prevented until the switch 1SW is operated. A variable restriction 128 in the pressure line 114 is set to establish a proper rate of operation of the motor 86 to provide the machine operator with time selectively to operate the switch 1SW so that the mechanism will be indexable one position at a time.

As shown in FIGS. 1, 2 and 3, the templates 40–45 are fixed onto the carriage 66 of the index mechanism and extend horizontally outward therefrom toward the tracing stylus 38. The templates 40–45 are each received in a recess 130 in the carriage 66 and clamped in position by a strip 132 and a machine screw 134 at each end thereof. Each of the screws 134 for a particular one of the templates 41 through 45 is inserted through a clearance hole 136 through the carriage 66, clamp strips 132 and other templates above it so that each template may be unclamped and removed without requiring that any other of the templates 40–45 be removed.

As can be seen with reference to FIG. 1, the outer edge of each of the templates 40–45 is presented to the stylus 38 such that only one of them can be engaged with the stylus 38 at any predetermined position of the carriage 66 on the index mechanism 48. The carriage 66 is shown in FIG. 1 in its uppermost predetermined position. Due to the stepped relation of the templates 40–45 on the carriage 66, only the template 45 can be engaged by the stylus 38 since the template 45 extends outward from the mechanism 48 the greatest amount and prevents movement of the stylus inward to engage any of the other templates 40–44. After indexing the carriage 66 downward to its next lower predetermined position, the template 45 is moved to the position 138 where it is out of reach of the stylus 38 in the vertical direction. At the same time, the template 44 is moved to the position where the template 45 was and the template 44 is the only one engagable by the stylus 38. Thus it can be seen that by successive step by step indexing of the mechanism 48 to shift the carriage 66 downward to each of its predetermined positions, the templates 40–45 are presented seriatim to the stylus 38 for tracing. As can be seen, the templates 40–45 must extend a considerable distance from the indexing mechanism 48 and occupy considerable space and this space occupied must be kept to a minimum to allow access to the machine for the machine operator. By this described mechanism, a minimum space is needed and the templates 40–45 can be mounted close to one another and moved only short distances to render the templates effective one at a time to control the machine operation over the full contour depth range corresponding to the radius of the broken circle 46. A minimum amount of space is required for the index mechanism 48 together with that space required for the compact and slightly stepped stack of templates 40–45.

What is claimed is:
1. In a machine tool having a tracing mechanism including a stylus normally oriented on an axis extendng in a fixed direction and a slide movable in response to deflection of the stylus, a mechanism to present a series of templates one at a time for engagement with the stylus comprising:
 (a) a carriage having a plurality of templates attached thereto, extending parallelly outward therefrom and oriented in a stepped relationship one to the other in a direction oblique to the axis of the stylus,
 (b) means to support said carriage for movement in said oblique direction, and
 (c) a motor selectively energizeable and connected to move said carriage through a series of predetermined positions on said support means whereby said templates on the carriage are engageable by the stylus one at a time in accordance with said predetermined positions.

2. In a machine tool having a tracing mechanism including a deflectable stylus oriented on an axis extending in a fixed direction and a slide movable in response to deflection of the stylus, a mechanism to present a series of templates one at a time for engagement with the stylus comprising:
 (a) a carriage having means to attach the series of templates thereon in a parallel array,
 (b) means to support said carriage for movement in a direction oblique to the axis of orientation of the stylus and transverse to the template array,
 (c) means to define a series of predetermined positions of said support means in each of which one of the series of templates thereon is engagable by said stylus,
 (d) means to lock said carriage in each of said predetermined positions,
 (e) means selectivity to release said lock means and
 (f) power means selectively energized and connected to shift said carriage selectively one way and the other in said oblique direction when said lock means is released to present a selected one of the series of templates for engagement by the stylus.

3. The mechanism of claim 2 wherein:
 (a) said means to shift the carriage is a reversibly operated motor connected to said carriage,
 (b) said means defining the series of predetermined positions is an index wheel having a series of spaced notches therearound and connected to said motor for rotation thereby when said carriage is moved, and
 (c) said lock means is a plunger adapted to engage said index wheel in said notches to prevent rotation thereof.

4. A multiple template tracing mechanism comprising in combination:
 (a) an elongated stylus deflectable laterally from an axis extending in a fixed direction,
 (b) a plurality of templates of progressively varying departure from a desired contour,
 (c) means to support said templates in a parallel array adjacent said stylus and in a stepped relationship one to the other in a direction oblique to the axis from which said stylus is deflectable, and
 (d) means to move said support means in said oblique direction to a series of predetermined positions to present said templates for engagement by said stylus one at a time in correspondence with said predetermined positions.

References Cited by the Examiner
FOREIGN PATENTS

| | | |
|---|---|---|
| 93,641 | 9/1897 | Germany. |
| 120,541 | 5/1901 | Germany. |
| 1,070,472 | 12/1959 | Germany. |
| 906,287 | 9/1962 | Germany. |

CHARLES W. LANHAM, *Primary Examiner.*